UNITED STATES PATENT OFFICE.

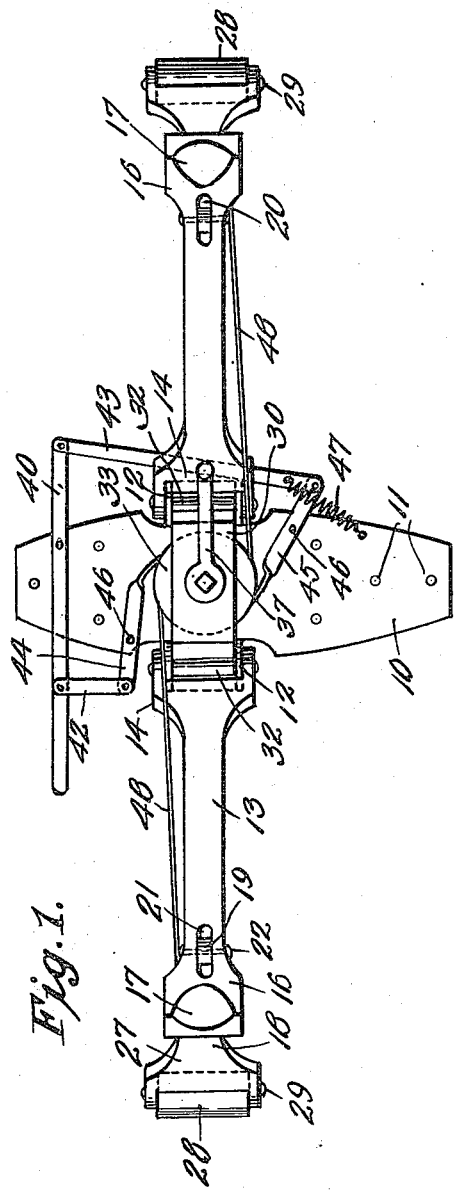

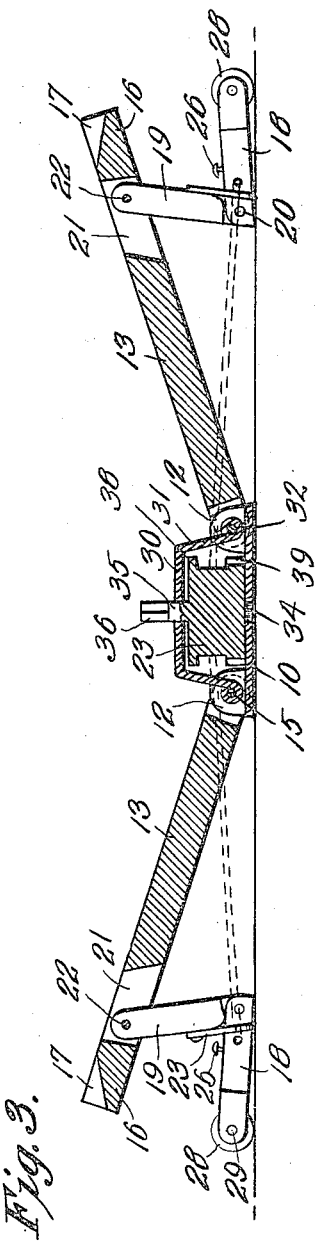

JAMES BLACK, OF STRAWN, TEXAS.

AUTOMOBILE-JACK.

1,281,491.   Specification of Letters Patent.   Patented Oct. 15, 1918.

Application filed May 4, 1918. Serial No. 232,529.

*To all whom it may concern:*

Be it known that I, JAMES BLACK, a citizen of the United States, residing at Strawn, in the county of Palo Pinto and State of Texas, have invented certain new and useful Improvements in Automobile - Jacks, of which the following is a specification.

This invention is a vehicle jack and has special reference to automobile jacks.

One object of this invention is the production of an automobile jack which is adapted to be placed upon a support, such for instance, as the floor of a garage, thus permitting an automobile to be driven thereover, whereby when desired, the jack will be actuated for lifting the automobile.

Another object of this invention is the production of an automobile jack wherein a pair of pivotal beams are provided for engaging an axle, or axle casing of an automobile for lifting the same and holding the automobile in an elevated position as long as desired.

Another object of this invention is the production of an automobile jack wherein there are provided pivotally supported beams, to which standards are connected, thus allowing the standards to hold the beams in elevated positions, when desired.

Another object of this invention is the production of an automobile jack consisting of a plate having beams pivotally mounted thereon, standards pivotally mounted upon the beams, together with actuating means upon the plate for drawing upon the standards and retaining the standards in set positions, thus allowing the standards to elevate and retain the beams in set position.

Broadly stated, this invention consists of a base plate, a drum rotatably mounted upon said plate, means for holding said drum against accidental rotation in one direction, beams pivotally mounted upon said plate, sectional standards pivotally connected to said beams, means for holding said standards against accidental collapsing, and means connected to said standards and said drum for moving said standards as the drum is rotated, thus allowing the outer ends of the beams to be elevated and releasably retained in a set position.

With these and other objects in view, this invention consists of certain novel combinations, constructions and arrangement of parts as will be hereinafter fully described and claimed.

One practical form of construction and assembly of the present invention will be hereinafter described and is illustrated in the accompanying drawing, in which Figure 1 is a top plan view of the jack, constructed in accordance with the present invention.

Fig. 2 is a side elevation of the jack, the pawl mechanism for the drum being removed.

Fig. 3 is a longitudinal section through the jack, the pawl mechanism and the drawing means being removed.

Fig. 4 is a plan view of the base plate showing the pawl mechanism mounted thereon, the drum and the inner ends of the beams being shown in section, and Fig. 5 is a front elevation of one of the standards.

In the preferred embodiment of the present invention, about to be described, 10 indicates the base plate, as shown particularly in Fig. 4. This base plate 10 is elongated and is adapted to be provided with a number of apertures 11, thus permitting anchoring means to be passed therethrough for holding the plate against any tendency of accidental shifting. If the jack is used in a garage having a concrete floor, it is desired to secure the plate to a beam embedded in the floor. This plate 10 has bearing ears 12 struck upwardly therefrom, the ears being raised upon each side of the plate and in parallel relation with respect to each other. The beams 13 are elongated, as illustrated in Figs. 1, 2 and 3 and have forked inner ends 14, as shown clearly in Fig. 4. These forked ends 14 are positioned to fit upon the outer surfaces of each pair of ears 12 and the pivot bolts 15 pass through the forked ends 14 and the ears 12. Thus it will be seen that the inner ends of the beams 13 are pivotally mounted upon the plate. It should further be noted that these beams extend in direct alinement with each other, since they are pivotally mounted upon opposite sides of the plate 10. The outer ends of these beams 13 have integral heads 16. The heads 16 are provided with diagonal rounded notches 17 for providing bearings for the axle casing engaged thereby when the jack is in use.

The standards comprise base sections 18 and top sections 19. Each base section 18 is pivotally connected by a pin 20 to the top section 19, thus pivotally connecting the two sections of each standard together. The upper ends of the top sections 19 project into slots 21 formed in the beams 13 adjacent the heads 16. Pivot pins 22 pass through the inner ends of the sections 19 and the beams 13, thus pivotally mounting these standards upon the beams 13. For the purpose of holding the two sections of each standard in alinement with each other and against accidental collapsing, a bracing plate 23 is pivotally mounted as indicated at 24 upon each top section 19. These plates 23 have slots 25 extending thereinto for receiving the studs 26 carried by the base sections 18. It should further be noted that the base sections 18 have comparatively broad forked lower ends 27 within which broad bearing rollers 28 are rotatably supported upon bearing shafts 29.

A housing strip 30 comprises a horizontal top having side walls 31, the lower ends of the side walls being coiled to form sleeves 32. These sleeves 32 are interposed between the parallel ears 12 to fit upon the pivot bolts 15. Thus it will be seen that these sleeves will hold the ears against accidental collapsing or bending when the beams are in use.

The drum 33 is positioned upon the base plate 10 and has a lower stub 34 projecting into the base plate 10. The stub shaft 35 extends through the top of the housing strip 30 and this stub shaft 35 has a squared upper end 36. The crank 37 may therefore be placed upon the squared end 36 of the shaft 35 and may be swung to rotate the drum 33. It will be noted that the drum 33 has a flange 38 adjacent its top and is provided with an annular rack 39 adjacent its lower portion and contiguous to the base plate 10.

A bar 40 is pivotally mounted as indicated at 41 upon the base plate 10 and this bar 40 has a short link 42 pivotally mounted upon one end and a comparatively long link 43 pivotally mounted upon its opposite end. The pawls 44 and 45 are pivotally mounted as indicated at 46 upon the base plate 10, the pawl 44 being pivotally connected to the link 42 and the pawl 45 being pivotally connected to the link 43. The coiled spring 47 has one end thereof pivotally connected to the base plate 10 and its opposite end is connected to the link 43. Accordingly, the tension of this coil spring 47 will be such as to shift the links and the bar for urging the pawls to rotate in a clock-wise direction, thus bringing the free ends of the pawls into engagement with the annular rack 39 of the drum 33.

Cables 48 have their inner ends secured in any suitable manner to the drum 33 while their outer ends are secured as indicated at 49 to the base sections 18 of the standards. It is of course obvious that these cables may be of wire, hemp or other material or chains may be used, without departing from the spirit of the present invention.

In operation, a pair of jacks as hereinbefore described are preferably employed, thus providing a jack for each end of the automobile to be lifted. Under normal conditions, the retaining plates 23 may be swung upon their pivots 24 to release the studs 26. Therefore, the base sections may be swung to the position indicated in Fig. 3, thus causing the standards to be in a collapsed condition, whereby the beams may be carried in their lowermost positions. The automobile may be driven over the jacks until its axle casings are in alinement with the beams 13. At this time the standards may be pulled manually to bring their sections into alinement with each other, as indicated in full lines in Fig. 2 and at this time the retaining plates may be swung into engagement with the studs 26, thus holding the standards against accidental collapsing, or in rigid condition. When in the position indicated in full lines in Fig. 2, the outer ends of the beams will be adjacent the axle casing. The crank 37 may be then swung to rotate the drum, thus drawing upon the cables 48. As the cables are wound upon the drum 33, the outer ends of the cables will draw the lower ends of the standards inwardly. As the lower ends of the standards are provided with rollers, it is obvious the standards may be easily moved with the least amount of friction. As the lower ends of the standards move inwardly, it is obvious the upper ends of the standards will move upwardly and thus shift the outer ends of the beams upwardly. Therefore, when the standards and beams have attained the position indicated in dotted lines in Fig. 2, it is obvious the automobile will be in an elevated or jacked position. The engagement of the pawls with the rack of the drum will cause the drum to be held against accidental rotation. Therefore, the cables will be held against unreeling from the drum and for this reason the standards and beams will be held in a set position to retain the automobile in an elevated position.

When it is desired to lower the automobile, the bar 40 or either of the links may be shifted to pull the pawls in a counter-clockwise direction, thus causing the pawls to disengage the rack of the drum. The weight of the automobile will therefore cause the standards to move outwardly at their lower ends, thus permitting the outer ends of the beams to move downwardly. The beams will therefore disengage the axle casing since they will move further in a downward direction, due to their own weight and for this reason the automobile may pass from over the jack. At this time, the retaining plates may be shifted from engagement with the studs and the standards be permitted to move to collapsed positions, although of course, such action is not necessary. As soon as the links and pawls have been released, the pawls will engage the rack of the drum, thus causing the jack to be in condition for a subsequent jacking operation.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a device of the class described, the combination of a base plate, beams pivotally mounted upon said base plate, sectional standards pivotally connected together and secured to said beams, means for urging said standards to extended positions for elevating the outer ends of said beams, bracing plates pivotally mounted upon one section of each standard, each plate having a slot therein, the remaining section of each standard having a stub, whereby the stub may be received within the slot to allow the bracing plates to extend across the joints of the sectional standards, thus holding the standards against accidentally collapsing when in use.

2. In a device of the class described, the combination of a base plate, parallel ears struck upwardly from said base plate, bolts carried by said ears, a housing strip having sleeves at its ends interposed between said ears and carried upon said bolts, a drum rotatably mounted upon said base plate and said housing, means for rotating said drum, beams pivotally mounted upon said bolts, standards connected to said beams, and flexible means connected to said standards and said drum for shifting the standards and elevating the beams as the drum is rotated.

3. In a jack of the class described, the combination of a base plate, parallel ears struck upwardly from said base plate, a housing strip having sleeves carried between said ears, beams pivotally mounted upon said ears, standards connected to said beams, a drum rotatably mounted upon said base plate and said strip, flexible means connecting said drum to said standards, pawls pivotally mounted upon said plate and engaging said drum for holding the same against accidental rotation in one direction, and means for simultaneously disengaging the pawls from engagement with the drum for allowing the standards to be freed and the means to move the drum for allowing the standards to be freed and the beams to move downwardly when desired.

4. In a device of the class described, the combination of a base plate, elevating means connected to said base plate, a drum rotatably mounted upon said base plate and connected to said elevating means, oppositely extending pawls pivotally mounted upon said base plate, a long link connected to one pawl and a short link to the remaining pawl, an elongated bar having one end secured to the long link and being mounted upon said base plate and connected to and extending beyond the short link, whereby the projecting end of the bar may be shifted for pushing upon the short link and pulling upon the long link, thus simultaneously disengaging said pawls from engagement with said drum for freeing the drum.

In testimony whereof I affix my signature in presence of two witnesses.

JAMES BLACK.

Witnesses:
ORON M. HURST,
J. W. McCORKLE.

Copies of this patent may be obtained for five cents each, by addressing the "Commissioner of Patents, Washington, D. C."